United States Patent [19]

Horbaschek et al.

[11] Patent Number: 5,495,514
[45] Date of Patent: Feb. 27, 1996

[54] X-RAY DIAGNOSTICS INSTALLATION HAVING A MOTION DETECTOR CONTROLLING A FILTER UNIT DEPENDENT ON EXPOSURE PARAMETERS

[75] Inventors: Heinz Horbaschek; Heinz Eschenbacher, both of Erlangen, Germany

[73] Assignee: Siemens Altiengesellschaft, Munich, Germany

[21] Appl. No.: 353,692

[22] Filed: Dec. 12, 1994

[30] Foreign Application Priority Data

Dec. 13, 1993 [DE] Germany .......................... 43 42 476.7

[51] Int. Cl.$^6$ ................................................. H05G 1/64
[52] U.S. Cl. ......................... 378/98.2; 378/98.3; 378/98.7
[58] Field of Search ................................ 378/98.2, 98.3, 378/98.5, 98.7

[56] References Cited

U.S. PATENT DOCUMENTS

| | | | |
|---|---|---|---|
| 4,485,403 | 11/1984 | Illetschko | 358/167 |
| 4,663,773 | 5/1987 | Haendle et al. | 378/98.12 |
| 5,091,925 | 2/1992 | Haendle et al. | 378/98.2 |
| 5,264,932 | 11/1993 | Haendle et al. | 378/98.2 |

FOREIGN PATENT DOCUMENTS 2264021  11/1993  United Kingdom .

Primary Examiner—Davis L. Willis
Assistant Examiner—Don Wong
Attorney, Agent, or Firm—Hill, Steadman & Simpson

[57] ABSTRACT

An x-ray diagnostics installation has an x-ray source connected to a parameter setting unit which sets exposure parameters (operating characteristics) of the x-ray source, and an x-ray image intensifier video chain. The x-ray image intensifier video chain includes a processing circuit connected to a video pick-up stage and a motion detector. The processing unit controls the parameters of a filter unit for chronological filtering of the video signal. The motion detector is connected to the parameter setting unit for the x-ray source, and controls the filter unit depending on the exposure parameters which are set for a given exposure, such as the level of the video signal, the tube voltage, the radiation dose, and the imaging format of the x-ray image intensifier, all of which are set at the parameter setting unit and which characterize the exposure.

17 Claims, 1 Drawing Sheet

X-RAY DIAGNOSTICS INSTALLATION HAVING A MOTION DETECTOR CONTROLLING A FILTER UNIT DEPENDENT ON EXPOSURE PARAMETERS

BACKGROUND OF THE INVENTION

1. Field of the Invention

The present invention is directed to an x-ray diagnostics installation of the type having an x-ray source with exposure parameters which are set in a parameter setting unit, and an x-ray image intensifier video chain which includes a processing circuit connected to a video pick-up unit and which includes a motion detector, the processing circuit controlling the parameters of a filter unit for the chronological or temporal filtering of the video signal.

2. Description of the Prior Art

X-ray diagnostics installations of the type generally described above effect a reduction in the quantum noise, and temporal noise such as, for example, electrical noise in the x-ray image.

Exposures are made in x-ray diagnostics installations with a radiation dose which is as low as possible in order to protect the patient from excessive radiation exposure. As a result, however, quantum noise constitutes an unavoidable physical limit in such systems. In order to reduce the quantum noise, chronological low-pass filtering or chronological averaging of the video signals are used in the production of image sequences, as disclosed, for example, in German OS 34 26 830. The present of chronological changes within the video signal, i.e., differences in the subtraction image, are thereby detected by means of a threshold circuit. Parameters of the filter circuit, for example the time constant, are then modified pixel-by-pixel based on the output of the threshold circuit, so that moving image portions are reproduced with a slight low-pass effect but noisy, stationary image parts are reproduced with a high degree of low-pass filtering, and are thus displayed with a reduced noise content.

A compromise among the radiation dose, the presentations of motion in the displayed image, and the chronological filtering must be made in order to obtain an optimum image quality even for chronologically changing events such as, for example, fast movements.

A problem in such known systems, however, is that making a distinction in subtraction image between frame-to-frame differences caused by noise and the frame-to-frame differences caused by motion is extremely difficult. Chronological filtering which is different for the individual pixels can thus not be controlled in an accurate manner.

German OS 31 21 597 discloses a system for reducing noise in video signals, including a motion detector which weights the current video signal and a delayed video signal. For producing a signal indicative of motion, the motion detector includes a subtraction unit followed by circuitry which is controlled by a control voltage derived from the video signal, and which represents the amplitude of the noise.

An automatic image quality compensation method and apparatus are disclosed in German OS 42 40 215 which employ fuzzy logic for improving the image quality and, among other things, improving the signal-to-noise ratio. For this purpose, the brightness and the sharpness of the image content, as well as the signal-to-noise ratio in the video signal are analyzed using fuzzy logic and are compensated dependent on this analysis.

SUMMARY OF THE INVENTION

An object of the present invention is to provide an x-ray diagnostics installation wherein an image of an examination subject is displayed with a noticeable reduction in noise, but without smearing moving objects in the image.

The above object is achieved in accordance with the principles of the present invention in an x-ray diagnostics installation having an x-ray source operated by an exposure parameter setting unit and having an x-ray image intensifier video chain which includes a processing circuit, a video pick-up unit and a motion detector, wherein the motion detector is connected to the parameter setting unit which operates the x-ray source, and the motion detector controls the parameters of a filter unit for chronologically filtering the video signal, so that the control of the filter unit by the motion detector ensues dependent on the exposure parameters which are set by the parameter setting unit for operating the x-ray source. This installation produces an image in which objects are reliably recognizable, even in the case of a noisy image, so that different filtering can be set pixel-by-pixel in the case of motion of the object.

In an embodiment of the x-ray diagnostics installation of the invention, the parameter setting unit includes control elements for setting at least one of the video signal level, the tube voltage of the x-ray source, the image brightness, or the radiation dose, and the motion detector controls the filter unit dependent on at least one of these parameters. This results in the motion detector automatically adapting to the "controlling" exposure parameter or parameters. If the x-ray diagnostics installation is of a type having an x-ray image intensifier with a variable imaging format, the control of the filter unit can ensue dependent on the imaging format of the x-ray image intensifier. Further exposure parameters which result in an automatic matching of the motion detector to the parameter are: scan modes of the image sensor, the gain factor of the exposure control, the system characteristic ($\gamma$ curve) and the motion of the patient table or the motion of the gantry supposing the examination apparatus components.

In an embodiment of the invention, the motion detector includes a first spatial low-pass filter to which the difference between the current video signal and a stored video signal is supplied, and an absolute value (magnitude) forming unit connected to the low-pass filter. The absolute value forming unit is connected to a table memory for the k factor, the output which controls the parameter of the filter unit.

A simple, level-dependent control of the filter unit is obtained in an embodiment wherein the motion detector includes a further low-pass filter, in addition to the aforementioned low-pass filter, to which the current video signal is also supplied, a table memory for a threshold connected to the further low-pass filter, with the output signal of the table memory being superimposed with the output signal from the absolute value formation unit in an addition unit. The difference magnitude obtained in this way with the level-dependent threshold controls the chronological low-pass filtering via a further table memory. Control dependent on the exposure parameters such as, for example, the tube voltage and/or the radiation dose can be achieved by making the table memories variable.

The installation can be adapted for different sizes of moving subjects by making the spatial low-pass filter or filters variable in bandwidth, for example by means of a selection switch connected to the low-pass filter or filters for setting the bandwidth thereof. A variation in the size of moving subjects due to a variable imaging format of the x-ray image intensifier can be achieved by supplying control signal from the overall system control computer to the low-pass filter or filters for setting the bandwidth. Manual setting by means of a control element can also be employed.

The motion detector can operate, or be controlled, according to the rules of fuzzy logic, or may contain neural networks for improving the detection and control, particularly by taking expert knowledge into consideration. The use of fuzzy logic is particularly suitable for the recognition of a subject in the presence of a noisy background.

The control of the chronological filtering can also be implemented according to the rules of fuzzy logic, because a smooth transition between image zones respectively having strong and weak chronological filtering can be achieved due to the elimination, in fuzzy logic, of rigid switching thresholds. Unnaturally strong noise spikes can thus be avoided.

Implementing various types of controls according to the rules of fuzzy logic is described, for example, in the article "Das Fuzzy-Mobil" from the periodical mc, March 1991, pp. 50–63, wherein the rules for fuzzy control are described for vehicles. Generic "unsharp" logic rules and the rules to be established for a control scheme are disclosed therein.

Neuro-computers and their software are also known. Examples are disclosed in the article "Networks for Approximation and Learning," Proceedings of the IEEE, Vol. 78, No. 9, September 1990, and the article "Fast Learning in Networks of Locally-Tuned Processing Units", Neuro-computation 1, pp. 281–294, Massachusetts Institute of Technology, 1989. Self-learning possibilities of neural networks are also described in these articles, allowing the prevailing conditions in a system to be taken into consideration in the formulation of control signals.

DESCRIPTION OF THE PREFERRED EMBODIMENTS

Figure 1:
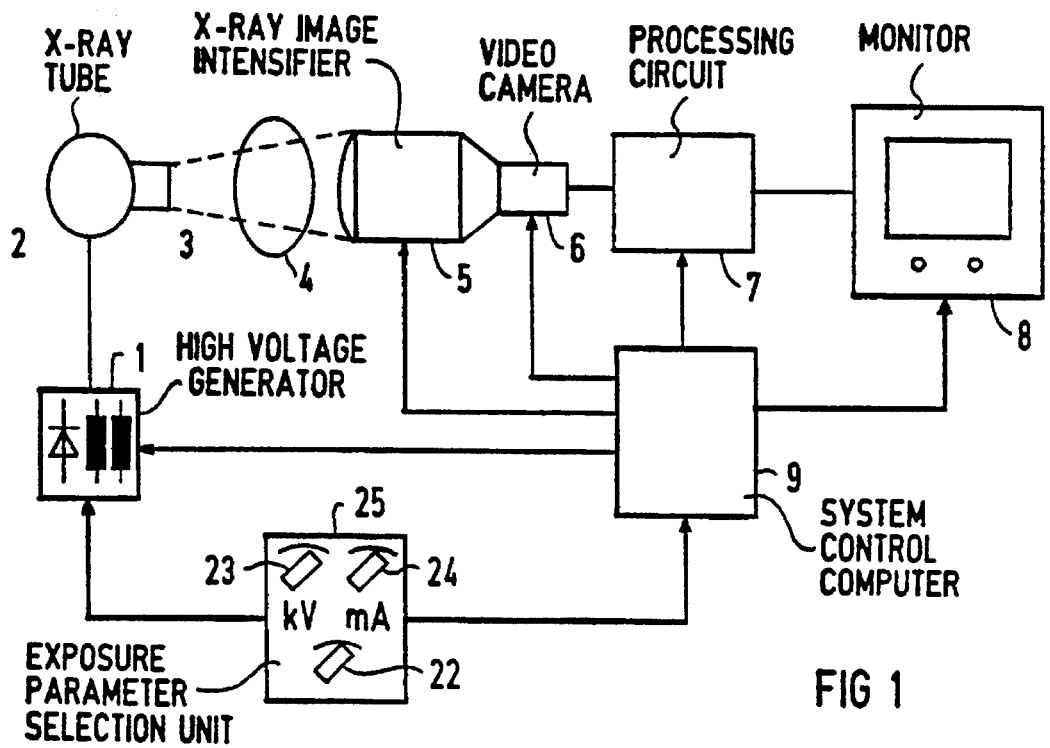
FIG. 1 is a schematic block diagram of an x-ray diagnostics installation constructed in accordance with the principles of the present invention.

FIG. 1 shows an x-ray diagnostics installation which includes an x-ray tube 2 driven by a high-voltage generator 1. The x-ray tube 2 emits an x-ray beam 3 which penetrates a patient 4. An x-ray image consisting of x-rays attenuated by the patient 4 according to the transparency of the patient 4 is produced on the input luminescent screen of an x-ray image intensifier 5, which converts this x-ray image into a visible image. The visible image which arises on the output luminescent screen of the x-ray image intensifier 5 is picked up by a video camera 6 which is connected to a processing circuit 7. The output of the processing circuit 7 is connected to a monitor 8 for playback of the x-ray image. A system control computer 9 is connected to the high-voltage generator 1, the x-ray image intensifier 5, the video camera 6, the processing circuit 7 and the monitor 8 for controlling and clocking those components.

Exposure parameters, for example the tube voltage (kv), the dose (mA), the imaging format of the x-ray image intensifier 5, the scan modes of the image sensor in the video camera 6, the gain factor of the exposure control, the system characteristic (γ curve), the image brightness, and the motion of the patient support of the gantry which supports the examination components can be set at a parameter setting unit 25 by the operation of respective selection switches 22 through 24. In the illustrated exemplary embodiment of FIG. 1, only the exposure parameters of tube voltage (kv), dose (mA) and the imaging format of the x-ray image intensifier 6 are shown, for simplicity.

Figure 2:
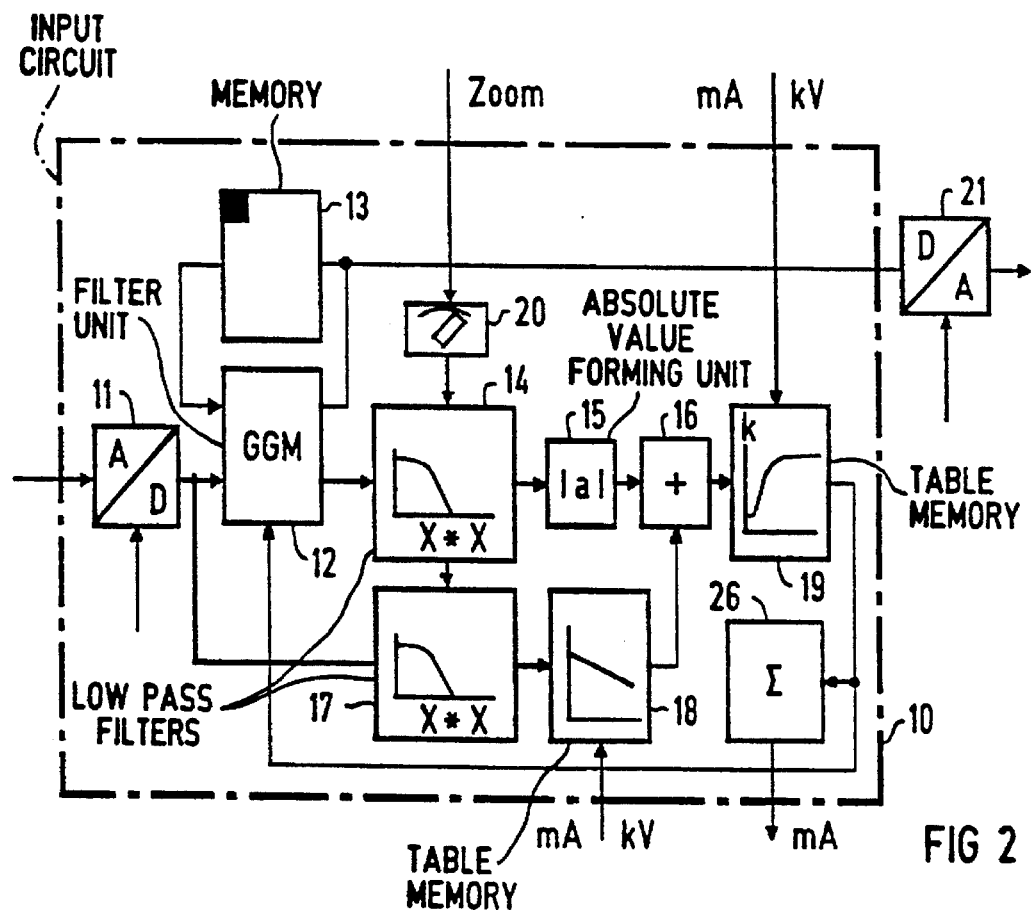
FIG. 2 is a block diagram of a filter circuit with a motion detector constructed in accordance with the principles of the present invention for use in the x-ray diagnostics installation of FIG. 1.

A digital input circuit 10 of the processing circuit 7 is shown in FIG. 2. This digital input circuit 10 includes an analog-to-digital converter 11 which digitizes the incoming video signal supplied by the video camera 6. A digital output signal from the converter 11 is supplied to a filter unit 12, which is connected to an image memory 13, for example a frame buffer.

For filtering, the current video signal from the analog-to-digital converter 11 and the preceding video signal stored in the image memory 13 are integrated pixel-by-pixel in a known manner, for example by sliding, weighted averaging, with the relative proportion of the factors representing the current video signal and the stored video signal being varied dependent on a control signal. A "mixing" ratio of the current video signal and the stored video signal can thus be set. For this purpose, a proportion factor k for the current video signal and a proportion factor 1-k for the stored video signal are varied dependent on motion within the image. The second output of the filter unit 12 is a video signal corresponding to the difference between the current video signal and the preceding video signal for each pixel. A first spatial low-pass 14 is connected to the output of the filter unit 12, and forms an average over a plurality of pixels. An absolute value (magnitude) forming circuit 15 is connected to the output of the low-pass filter 14, and has an output supplied to a first input of an addition unit 16.

A second spatial low-pass filter 17 is connected to the output of the high-voltage analog-to-digital converter 11, and also calculates an average over a plurality of pixels. The output signal of the second low-pass filter 17 is supplied to a table memory 18, such as a LUT, for thresholds, and converts the output signal from the converter 11 into a threshold associated therewith in the stored table. These thresholds are supplied to a second input of the addition unit 16, and are superimposed with the magnitude of the difference signal. The sum which is present at the output of the addition unit 16 is supplied to a further table memory 19, which may also be a LUT, for the k factor, which converts the sum signal into a corresponding value by means of the table stored therein, and thus controls the k factor of the filter unit 12 for the sliding, weighted averaging.

Detection of motion is made by evaluating the difference signal in the first low-pass filter 14 and the absolute value forming unit 15. The probability that motion is present increases as the magnitude of the difference signal increases, and the k factor is accordingly further increased by means of the table 19, so that the current video signal is weighted more highly than the stored video signal.

By making use of the difference signal magnitude and the level-dependent threshold, the distinction between noise and motion is made dependent on the signal level of the respective pixel environment. It is therefore taken into consideration that the contrast/noise ratio of the moving object to be detected is better at locations of high x-ray dose than at locations having a low x-ray dose.

A selection switch 20 is connected to the low-pass filters 14 and 17, by means of which the bandwidth of the low-pass filters, i.e. the size of the low-pass mask ($X^*X$ pixels) being manually settable by the selection switch 20. Values of 3×3 through 7×7 pixels can preferably be selected.

Because the size of the moving subjects also changes due to the variation of the magnification factor of the x-ray image intensifier 5 by zooming, for example, the size of a catheter tip, the filter effect of the low-pass filters 14 and 17 can also be coupled to a zoom selector 22, connected to the system control computer 9, so that the area of the low-pass mask utilized in the low-pass filters 14 and 17 is also enlarged given enlargement of the zoom factor.

The system control computer 9 can also alter the contents of the table memories 18 and 19, corresponding to the current exposure parameters such as, for example, the tube voltage values (kV) and dose values (mA) selectable by the switches 23 and 24. The system control computer 9 influences the table memories 18 and 19 by either calling in different curves, or loading in new curves from a main memory (not shown). As a result, the motion detection is automatically matched to the signal-to-noise ratio which is dependent on different exposure conditions.

The averaged video signal can be taken at the first output of the filter unit 12, or at the input of the image memory 13 and can be processed by further components of the processing circuit 7. The averaged video signal, however, can also be directly displayed on the monitor 8 as an x-ray image via a digital-to-analog converter 21 for monitoring.

As a result of the described motion detection, the parameters of the filter unit 12 are varied pixel-by-pixel such that a high filtering ensues in more static image areas and a slight filtering ensues in highly (rapidly) moving image areas. A high noise reduction is thereby achieved in the stationary portion of tile image, which usually constitutes the "background" portion of the x-ray image, whereas motion blurring is avoided in the region of interest.

Because a large noise reduction ensues in the circuit 10 given slight motion, an examination can be conducted with a low x-ray dose in a fluoroscopy mode. Given pronounced motions, by contrast, it is advantageous to increase the x-ray dose so that the quantum noise does not represent a disturbing factor. At the same time, however, an iris diaphragm which, for example, precedes the video camera 6, must reduce the light flux so that an overdrive (blooming) is avoided and the average video signal remains constant. A control signal for operating the iris diaphragm can be generated by a sum circuit 26 connected to the output of the table memory 19. The sum circuit 26 generates a control signal, for controlling the dose,, dependent on the sum of the k factors.

Although modifications and changes may be suggested by those skilled in the art, it is the intention of the inventors to embody within the patent warranted hereon all changes and modifications as reasonably and properly come within the scope of their contribution to the art.

We claim as our invention:

1. An x-ray diagnostics installation comprising:

means for generating an x-ray image;

means supplied with said x-ray image for converting said x-ray image into a video signal, said means for generating an x-ray image and said means for converting said x-ray image into a video signal having a plurality of exposure parameters associated therewith;

filter means for chronologically filtering said video signal;

motion detector means, contained in said means for converting said x-ray image into a video signal, for controlling said filter means dependent on said exposure parameters; and means for displaying an image generated by said video signal.

2. An x-ray diagnostics installation as claimed in claim 1 wherein one of said exposure parameters comprises a signal level of said video signal, and wherein said motion detector means comprises motion detector for controlling said filter unit dependent on said video signal level.

3. An x-ray diagnostics installation as claimed in claim 1 wherein said means for generating an x-ray image includes an x-ray tube and wherein one of said exposure parameters comprises a tube voltage for said x-ray tube, and wherein said motion detector means comprises means for controlling said filter means dependent on said tube voltage.

4. An x-ray diagnostics installation as claimed in claim 1 wherein said means for generating an x-ray image includes an x-ray source and wherein one of said exposure parameters comprises a dose administered by said x-ray source, and wherein said motion detector means comprises motion detector means for controlling said filter unit dependent on said dose.

5. An x-ray diagnostics installation as claimed in claim 1 wherein said means for converting said x-ray image into a video signal includes an x-ray image intensifier having a variable imaging format, and wherein one of said exposure parameters comprises said imaging format of said x-ray image intensifier, and wherein said motion detector means comprises means for controlling said filter means dependent on said imaging format.

6. An x-ray diagnostics installation as claimed in claim 5 further comprising:

memory means for storing said video signal;

said filter means being supplied with a stored video signal from said memory means and a current video signal and comprising means for forming a difference signal comprised of said current video signal and said stored video signal relatively weighted by a k factor, said filter means having a control input; and said motion detector means comprising a low-pass filter supplied with said different signal from said filter means at an input thereof, and having an output, an absolute value forming unit having an input connected to the output of said low-pass filter, and having an output, and a table memory having an input connected to the output of said absolute value forming unit, said table memory having a table stored therein for k factors dependent on an output from said absolute value forming unit, and said table memory connected to said control input of said filter means and supplying a k factor to said control input from said table dependent on said output from said absolute value forming unit.

7. An x-ray diagnostics installation as claimed in claim 6 further comprising means for varying said table in said table memory dependent on one of said exposure parameters.

8. An x-ray diagnostics installation as claimed in claim 6 wherein said low-pass filter has a bandwidth, and further comprising means for varying said bandwidth of said low-pass filter.

9. An x-ray diagnostics installation as claimed in claim 8 wherein said means for varying the bandwidth comprises a manually operable selection switch for selecting a bandwidth.

10. An x-ray diagnostics installation as claimed in claim 9 wherein said means for generating an x-ray image includes a system control computer, and wherein said system control computer comprises said means for varying the bandwidth.

11. An x-ray diagnostics installation as claimed in claim 6 wherein said motion detector means comprises a further low-pass filter supplied at an input thereof with said current video signal, and having an output, a further table memory having an input connected to the output of said further low-pass filter, said further table memory having a table stored therein with a plurality of threshold values related to an output of said further low-pass filter, said table memory generating an output signal at an output thereof comprising a threshold corresponding to the output of said further low-pass filter, and addition means for adding said output :signal from said further table memory with said output from said absolute value forming unit, said addition means having an output connected to said input of said table memory for k factors.

12. An x-ray diagnostics installation as claimed in claim 11 further comprising means for varying at least one of the respective tables stored in said table memory and said further table memory dependent on one of said exposure parameters.

13. An x-ray diagnostics installation as claimed in claim 11 wherein each of said low-pass filter and said further low-pass filter has a bandwidth, and further comprising means for varying the bandwidth of at least one of said low-pass filter and said further low-pass filter.

14. An x-ray diagnostics installation as claimed in claim 13 wherein said means for varying the bandwidth comprises a manually operable selection switch for selecting a bandwidth.

15. An x-ray diagnostics installation as claimed in claim 13 wherein said means for generating an x-ray image includes a system control computer, and wherein said system control computer comprises said means for varying the bandwidth.

16. An x-ray diagnostics installation comprising:

means for generating an x-ray image;

means supplied with said x-ray image for converting said x-ray image into a video signal, means for adjusting a plurality of operating characteristics such as exposure parameters connected with said means for generating an x-ray image and said means for converting said x-ray image into a video signal;

filter means for chronologically filtering said video signal;

motion detector means, contained in said means for converting said x-ray image into a video signal, for controlling said filter means dependent on said exposure parameters; and means for displaying an image generated by said video signal.

17. An x-ray diagnostics installation as claimed in claim 16 wherein one of said exposure parameters comprises a signal level of said video signal, corresponding to the brightness of said x-ray image, and wherein said motion detector means comprises motion detector for controlling said filter unit dependent on said video signal level.

* * * * *